United States Patent
Oohira

(10) Patent No.: US 9,376,572 B2
(45) Date of Patent: *Jun. 28, 2016

(54) HIGHLY DIELECTRIC ELASTOMER MOLDED BODY AND ELECTRONIC COMPONENT MATERIAL FOR HIGH FREQUENCY USE

(75) Inventor: Kouya Oohira, Mie (JP)

(73) Assignee: NTN CORPORATION, Osaka (JP)

( * ) Notice: Subject to any disclaimer, the term of this patent is extended or adjusted under 35 U.S.C. 154(b) by 981 days.

This patent is subject to a terminal disclaimer.

(21) Appl. No.: 12/450,670

(22) PCT Filed: Apr. 16, 2008

(86) PCT No.: PCT/JP2008/057396
§ 371 (c)(1),
(2), (4) Date: Oct. 2, 2009

(87) PCT Pub. No.: WO2008/133130
PCT Pub. Date: Nov. 6, 2008

(65) Prior Publication Data
US 2010/0103638 A1   Apr. 29, 2010

(30) Foreign Application Priority Data

Apr. 24, 2007 (JP) ................................ 2007-114427
Nov. 29, 2007 (JP) ................................ 2007-309122

(51) Int. Cl.
| C08K 3/04 | (2006.01) |
| C09C 1/48 | (2006.01) |
| C08K 3/00 | (2006.01) |
| C08K 3/22 | (2006.01) |
| H01B 3/28 | (2006.01) |
| H01B 3/44 | (2006.01) |
| C08L 23/16 | (2006.01) |

(52) U.S. Cl.
CPC .............. C09C 1/48 (2013.01); C08K 3/0033 (2013.01); C08K 3/04 (2013.01); C08K 3/22 (2013.01); H01B 3/28 (2013.01); H01B 3/441 (2013.01); H01B 3/442 (2013.01); C01P 2006/40 (2013.01); C08L 23/16 (2013.01)

(58) Field of Classification Search
CPC ............ C08L 21/00; C08K 3/04; C08K 3/22; H01B 3/28; H01B 3/441; H01B 3/442
USPC .................................................. 524/495, 496
See application file for complete search history.

(56) References Cited

U.S. PATENT DOCUMENTS

| 6,818,821 B2 * | 11/2004 | Fujieda et al. | ................. 174/394 |
| 2007/0182640 A1 * | 8/2007 | Oohira | ................... 343/700 MS |

FOREIGN PATENT DOCUMENTS

| EP | 1 767 582 A1 | 3/2007 |
| JP | 09-031244 A | 2/1997 |
| JP | 2000-506305 A | 5/2000 |
| JP | 2005-89686 A | 4/2005 |
| JP | 2006-290939 A | 10/2006 |
| JP | 2006290939 A | * 10/2006 |
| JP | 2007-043236 A | 2/2007 |
| JP | 2007-063337 A | 3/2007 |
| JP | 2008-053527 A | 3/2008 |
| WO | WO97/32314 | 4/1997 |
| WO | WO2005/123841 A1 | 6/2005 |

OTHER PUBLICATIONS

PCT Search Report Dated Jul. 15, 2008.

* cited by examiner

*Primary Examiner* — Peter D Mulcahy
(74) *Attorney, Agent, or Firm* — Hedman & Costigan, P.C.; James V. Costigan; Kathleen A. Costigan

(57) ABSTRACT

The present invention provides a highly dielectric elastomer molded body which is inexpensive and excellent in its dielectric property, shock resistance, flexibility, and processability and can be used at a UHF band having 800 to 960 MHz and an electronic component material for a high frequency use. The highly dielectric elastomer molded body is formed by molding a highly dielectric elastomer composition comprising an elastomer and dielectric ceramic powder added thereto. The molded body has a tensile elongation not less than 250% and a hardness not more than 70. In measurement at a frequency of 950 MHz, a dielectric constant of the highly dielectric elastomer molded body is 4 to 10, and a dielectric dissipation factor thereof is not more than 0.02. An electronic component material for a high frequency use is made of the highly dielectric elastomer molded body.

5 Claims, No Drawings

HIGHLY DIELECTRIC ELASTOMER MOLDED BODY AND ELECTRONIC COMPONENT MATERIAL FOR HIGH FREQUENCY USE

TECHNICAL FIELD

The present invention relates to a highly dielectric elastomer molded body and an electronic component material for a high frequency use.

BACKGROUND ART

In recent years, with a remarkable spread of mobile phones, cordless phones, patch antennas for RFID and the like, lens antennas such as a radio telescope, a millimeter-wave radar, and the like and with significant progress of satellite communication apparatuses, a communication signal is demanded to have a high frequency use, and the communication apparatus is demanded to be more compact. As the dielectric constant of a material for an antenna incorporated inside the communication apparatus becomes higher, the communication signal is allowed to have a higher frequency, and the communication apparatus is allowed to be more compact. As the dielectric dissipation factor of a material for an antenna becomes lower, it is possible to decrease power consumption at the time of communication. The dielectric constant and the dielectric dissipation factor are parameters indicating the extent of a polarity inside a dielectric and the loss of an energy generated by polarization inside the dielectric or by application of conductivity thereto respectively.

As an elastomer dielectric material for the antenna, an ethylene propylene rubber material having not less than 15 in its dielectric constant is known (see patent document 1). Existing dielectric materials contain dielectric ceramic powder at a high ratio to allow the antenna to be compact. In recent years, with an increase of use of RFID in a band of 950 MHz, dielectric materials having 4 to 10 in the dielectric constant thereof and not more than 0.02 in the dielectric dissipation factor thereof are demanded. When the dielectric constant is larger than 10, a small antenna is produced. Consequently a small gain is obtained, which is unpreferable. When the gain is small, the distance in which communication can be accomplished becomes short.

As the dielectric materials having 4 to 10 in the dielectric constant thereof and not more than 0.02 in the dielectric dissipation factor thereof, those made of ceramic and resin are commercially available, but are inferior to the elastomer dielectric material in the shock resistance, flexibility, and processability thereof, which is unpreferable.

As compositions, composing elastomer composite materials, which have 4 to 10 in the dielectric constant thereof and not more than 0.02 in the dielectric dissipation factor thereof, those containing an ethylene elastomer or a styrene elastomer and fibrous dielectric ceramics added thereto are known (see patent document 2).

But the data of each of the dielectric properties described in the patent document 2 are values measured at 1 MHz or 3 GHz. The dielectric properties are not measured at 950 MHz. No description is made on the hardness of the composition, and sufficient optimization is not accomplished in consideration of the shock resistance, flexibility, and processability thereof.

In producing a patch antenna to be used at 950 MHz from a dielectric material having a dielectric constant of 4 to 10, a dimension not less than 100 mm is necessary. But it is expensive to form a sheet from ceramics or resin when the sheet has a dimension not less than 100 mm.

Patent document 1: Japanese Patent Application Laid-Open No. 2005-89686
Patent document 2: Japanese Patent Application Laid-Open No. 9-31244

DISCLOSURE OF THE INVENTION

Problem to be Solved by the Invention

The present invention has been made to cope with the above-described problems. It is an object of the present invention to provide a highly dielectric elastomer molded body which is inexpensive and excellent in its dielectric property, shock resistance, flexibility, and processability and can be used at a UHF band having 800 to 960 MHz; and an electronic component material for a high frequency use.

Means for Solving the Problem

The highly dielectric elastomer molded body of the present invention is formed by molding a highly dielectric elastomer composition comprising an elastomer and dielectric ceramic powder added thereto. The molded body has a tensile elongation not less than 250% and a hardness not more than 70. In measurement at a frequency of 950 MHz, a dielectric constant of the molded body is 4 to 10, and a dielectric dissipation factor thereof is not more than 0.02.

The tensile elongation of the molded body and the hardness thereof are numerical values measured in a tensile test of JIS K 6251 and a hardness test of JIS K 6253 respectively.

In the highly dielectric elastomer composition, 5 to 40 parts by weight of carbon black is mixed with 100 parts by weight of the elastomer.

The carbon black is other than acetylene-based carbon black.

In measurement at a frequency of 950 MHz, a dielectric constant of a sintered compact of the dielectric ceramic powder added to the elastomer is not less than 50.

The dielectric constant of the dielectric ceramic powder is 180. 50 to 300 parts by weight of the dielectric ceramic powder is added to 100 parts by weight of the elastomer. The dielectric constant of the dielectric ceramic powder is 120. 150 to 450 parts by weight of the dielectric ceramic powder is added to 100 parts by weight of the elastomer.

The specific gravity of the elastomer is 0.8 to 1.1. The elastomer consists of one kind or not less than two kinds of elastomers selected from a group of a styrene elastomer and an olefinic elastomer. The elastomer is ethylene propylene rubber.

An electronic component material, for a high frequency use, which is used to handle an electric signal of a UHF band having a frequency of 800 to 960 MHz is made of the highly dielectric elastomer molding.

The electronic component material for a high frequency use is obtained by sticking an electrode to a surface of the highly dielectric elastomer molded body or insert-molding the electrode into the highly dielectric elastomer molded body.

Effect of the Invention

The highly dielectric elastomer molded body of the present invention is formed by molding the highly dielectric elastomer composition comprising the elastomer and dielectric ceramic powder added thereto. The molded body has a tensile elongation not less than 250% and a hardness not more than 70. Therefore the highly dielectric elastomer molded body is excellent in its shock resistance, flexibility, and processability and is thus preferable for the material of an antenna for RFID which is used in the band of 950 MHz.

In the highly dielectric elastomer composition, because 5 to 40 parts by weight of carbon black is mixed with 100 parts by weight of the elastomer, the process oil does not bleed on the surface of the molded body, and the adhesiveness of the highly dielectric elastomer composition to the electrode does not deteriorate. Therefore it is possible to suppress a change of the dielectric property of the highly dielectric elastomer molded body.

In measurement at the frequency of 950 MHz, the dielectric constant of the molded body is 4 to 10, and the dielectric dissipation factor thereof is not more than 0.02. Therefore the cost required to form the molded body into a patch antenna which is an electronic component for a high frequency use and is used at 950 MHz is lower than the cost required to form ceramics or resin into a sheet having a dimension not less than 100 mm. Because the specific gravity of the elastomer is 0.8 to 1.1, it is possible to make the highly dielectric elastomer molded body lightweight.

Because the electronic component material of the present invention for a high frequency use is made of the highly dielectric elastomer molding, it can be used in a high frequency region (frequency: 800 to 960 MHz). Because the electronic component material for a high frequency use is obtained by sticking the electrode to the surface of the highly dielectric elastomer molded body or insert-molding the electrode into the highly dielectric elastomer molded body, it is possible to produce the electronic component material for a high frequency use at a low cost.

BEST MODE FOR CARRYING OUT THE INVENTION

The highly dielectric elastomer molded body of the present invention is not limited to a specific one, provided that the tensile elongation of the molded body is not less than 250% and that the hardness thereof is not more than 70. As an elastomer that can be used, substances having rubber-like elasticity at a normal temperature can be used, regardless of whether they are organic, inorganic, natural or synthetic, as an elastomer.

When the tensile elongation of the molded body is less than 250%, deformation of a material does not follow a curved surface in sticking it thereon. Thereby there is a possibility that breakage or permanent deformation is generated. It is unpreferable that the hardness of the molded body exceeds 70 because shock-caused crack or breakage is liable to occur.

From the standpoint of lightening the highly dielectric elastomer molded body, it is preferable that the elastomer which is used in the present invention has a low specific gravity. The specific gravity of rubber is generally 0.8 to 2.0. In using the rubber as the elastomer composing the base of the highly dielectric elastomer composition of this embodiment, it is favorable that the specific gravity of the rubber is 0.8 to 1.1. It is more favorable that the specific gravity thereof is 0.8 to 1.0. It is unpreferable that the specific gravity thereof is less than 0.8 because the molded body has a low strength owing to a low molecular weight and the molded body has a large number of pores. It is unpreferable that the specific gravity thereof exceeds 1.1 because the weight of a product is large.

As the natural rubber elastomer, it is possible to use chlorinated rubber, rubber hydrochloride, cyclized rubber, maleic rubber, hydrogenated rubber, graft-modified rubber by grafting a vinyl monomer such as polymethyl methacrylate (PMMA), polyacrylonitrile (PAN), methacrylate ester with double bonds of natural rubber, and a block copolymer formed by refining the natural rubber in a nitrogen gas flow in the presence of a monomer. These elastomers include whose material is synthetic cis-1,4-polyisoprene in addition to those whose material is the natural rubber.

As the synthetic rubber elastomer, it is possible to use a polyolefin elastomer such as isobutylene rubber, ethylene propylene rubber, ethylene-propylene-diene rubber, ethylene-propylene terpolymer, chlorosulfonated polyethylene rubber; a styrene elastomer such as a styrene-isoprene-styrene block copolymer (SIS), a styrene-butadiene-styrene copolymer (SBS), a styrene-ethylene-butylene-styrene block copolymer (SEBS); isoprene rubber; urethane rubber; epichlorohydrin rubber; silicone rubber; nylon 12; butyl rubber; butadiene rubber; polynorbornene rubber, acrylonitrile-butadiene rubber. Of these elastomers, from the standpoint of the electrical properties, it is preferable to use the styrene elastomer and the olefin elastomer.

These elastomers can be used by mixing one kind or not less than two kinds thereof. In the range in which the elasticity of the elastomer is not damaged, it is possible to use one or not less than two kinds of thermoplastic resin. In the highly dielectric elastomer composition of this embodiment, when one or not less than two kinds of elastomers selected from among the natural rubber elastomer and/or the synthetic non-polar elastomer are used as the elastomer, it is possible to obtain a highly dielectric elastomer composition excellent in electric insulating property. Thus the highly dielectric elastomer composition can be preferably used for applications requiring insulating property. As the synthetic non-polar elastomer, of the above-described elastomers, it is possible to list the ethylene propylene rubber, the ethylene-propylene-diene rubber, the isobutylene rubber, the isoprene rubber, and the silicone rubber. Because the ethylene propylene rubber and the ethylene-propylene-diene rubber have a very low dielectric dissipation factor, these elastomers can be preferably used as materials of electronic parts such as antennas and sensors.

It is preferable that in measurement at a frequency of 950 MHz, the highly dielectric elastomer molded body of the present invention has a dielectric constant of 4 to 10 and a dielectric dissipation factor of not more than 0.02. By setting the dielectric constant and dielectric dissipation factor of the molded body to the above-described range, the molded body can be preferably utilized for RFID at a frequency band of 950 MHz.

When the dielectric constant is less than four, a less wavelength-shortening effect is obtained by a dielectric, which increases a necessary electrode dimension. Consequently a large antenna is produced and is thus unpreferable. When the dielectric constant is more than 10, a small antenna is produced and thus a small gain is obtained, which decreases a distance in which communication can be accomplished. When the dielectric dissipation factor is larger than 0.02, an electrical loss is large, which increases the power consumption and is thus unpreferable.

As the carbon black which can be used in the present invention, it is possible to list pigments such as hard carbon and soft carbon and carbon black used to improve wear resistance. But acetylene-based carbon black having a high conductivity is unpreferable because it greatly increases the dielectric dissipation factor. As commercially available products of the carbon black, it is possible to exemplify "SEAST S" produced by Tokai Carbon Co., Ltd.

The mixing ratio of the carbon black to 100 parts by weight of the elastomer is 5 to 40 parts by weight. It is unpreferable that the mixing ratio of the carbon black to 100 parts by weight of the elastomer is less than 5 parts by weight, because the carbon black has an oil-holding effect to a low extent and thereby process oil bleeds on the surface of the molded body, the adhesiveness of the highly dielectric elastomer composition to an electrode deteriorates, which greatly changes the dielectric property. It is unpreferable that the mixing ratio of the carbon black to 100 parts by weight of the elastomer is more than 40 parts by weight, because the dielectric dissipation factor becomes large. To obtain a high dielectric constant and a low dielectric dissipation factor, the optimum mixing ratio of the carbon black to 100 parts by weight of the elastomer is 10 to 35 parts by weight.

The dielectric ceramics used for the highly dielectric elastomer composition of the present invention substantially determines the permittivity of the elastomer molded body. It is preferable to use dielectric ceramics having a dielectric constant (frequency: 950 MHz) of not less than 50 when the powder thereof is processed into a sintered compact. When the sintered compact of the dielectric ceramics having less than 50 in its dielectric constant is used, it is necessary to use a large amount of the ceramics to keep the dielectric constant of the molded body at 4 to 10. Thus it is difficult to secure a necessary tensile elongation (not less than 250%).

It is preferable that the dielectric ceramic powder which can be used in the present invention is at least one substance selected from among oxides, carbonates, phosphates, and silicates of groups IIa, IVa, IIIb, and IVb; and composite oxides comprising the groups IIa, IVa, IIIb, and IVb. More specifically, $TiO_2$, $CaTiO_3$, $MgTiO_3$, $Al_2O_3$, $BaTiO_3$, $SrTiO_3$, $Ca_2P_2O_7$, $SiO_2$, $Mg_2SiO_4$, and $Ca_2MgSi_2O_7$ are listed. The average particle diameter of the ceramic powder is preferably 0.01 to 100 μm. It is unpreferable that the average particle diameter of the ceramic powder is less than 0.01 μm, because it is difficult to handle the dielectric ceramic powder. It is unpreferable that the average particle diameter of the dielectric ceramic powder is more than 100 μm, because there is a fear that variation of the dielectric characteristic is caused inside the molded body. More practical range of the particle diameter is 0.1 to 20 μm.

The mixing ratio of the dielectric ceramic powder is so set that the dielectric constant of the highly dielectric elastomer molded body and the dielectric dissipation factor thereof can be kept at 4 to 10 and not more than 0.02 respectively and that the tensile elongation of the molded body and the hardness thereof are not less than 250% and not more than 70 respectively.

For example, when the dielectric ceramic powder whose dielectric constant of about 180 is used, 50 to 300 parts by weight of the dielectric ceramic powder is added to 100 parts by weight of the elastomer. When the dielectric ceramic powder whose dielectric constant of about 120 is used, 150 to 450 parts by weight of the dielectric ceramic powder is added to 100 parts by weight of the elastomer.

In this embodiment, as components of the highly dielectric elastomer composition, the following components may be used in combination with the above-described components in the range in which the effect of the present invention is not damaged. (1) To improve the affinity of the interface of the elastomer (rubber) and the ceramic powder, the adhesiveness of the elastomer to the ceramic powder, and the mechanical strength of the highly dielectric elastomer composition, the highly dielectric elastomer composition contains a silane coupling agent, a titanate coupling agent, zirconia aluminate coupling agent or the like. (2) To improve the plating property, the highly dielectric elastomer composition contains a filler such as talc, calcium pyrophosphate or the like consisting of fine particle. (3) To improve the heat stability, the highly dielectric elastomer composition contains an antioxidant. (4) To improve the light resistance, the highly dielectric elastomer composition contains a light stabilizer such as an ultraviolet-absorbing agent. (5) To improve the flame-retardant property, the highly dielectric elastomer composition contains a flame retardant such as a halogen-containing compound, a phosphorous-containing compound and a flame retardant assistant such as an antimony-containing compound, zinc borate, barium metaborate, zirconium oxide, hydroxide. (6) To improve the shock resistance, the highly dielectric elastomer composition contains a shock resistance improver. (7) To improve the lubricating property, the highly dielectric elastomer composition contains a lubricant and a sliding property modifier (solid lubricant, liquid lubricant). (8) To color the highly dielectric elastomer composition, it contains a coloring agent such as dye, pigment or the like. (9) To adjust the property, the highly dielectric elastomer composition contains a plasticizer and a crosslinking agent. (10) To accelerate vulcanization, the highly dielectric elastomer composition contains a vulcanization accelerator.

In this embodiment, as components of the highly dielectric elastomer composition, the following various organic or inorganic fillers may be used in combination with the above-described components in the range in which the object of the present invention is not damaged. It is possible to use alkali metal titanate fiber such as glass fiber, potassium titanate whisker; titanium oxide fiber; boric acid-metal salt fiber such as magnesium borate whisker, aluminum borate whisker; silicic acid-metal salt fiber such as zinc silicate whisker, magnesium silicate whisker; carbon fiber; alumina fiber; and aramid fiber in combination with the above-described components.

The method of producing the highly dielectric elastomer molded body of the present invention is not limited to a specific method, but various mixing molding methods can be used. It is possible to preferably use a method of mixing the dielectric ceramic powder, the carbon black, various additives, a vulcanizer and the like with the elastomer to obtain the highly dielectric elastomer composition and kneading the highly dielectric elastomer composition with a Banbury mixer, a roller, a biaxial extruder or the like. It is possible to obtain the highly dielectric elastomer molded body by thereafter performing injection molding, extrusion molding, heated compression molding or the like.

In the present invention, the electronic component material for a high frequency use can be easily obtained by sticking an electrode on the surface of the highly dielectric elastomer molded body, sticking a highly dielectric elastomer on both surfaces of the electrode or insert-molding the electrode into the highly dielectric elastomer molded body.

As sticking means to be used in sticking processing, it is possible to use adhesive films such as TFA-880CC and TFA-890EA produced by Kyocera Chemical Corporation; E56 produced by Shin-etsu Chemical Industry Co., Ltd.; SAFV, SAFD, and SAFW produced by Nikkan Industry Co., Ltd. In addition, it is possible to stick the highly dielectric elastomer molded body and the electrode to each other by applying an adhesive agent thereto.

Regarding the insert molding, it is possible to fill and mold the highly dielectric elastomer composition in a molding die where the electrode is mounted at a predetermined position

EXAMPLES

Examples 1 Through 10 and Comparative Examples 5 Through 9

Ethylene propylene rubber ("EP35" produced by JSR Inc.), ceramic powder ("ST-NAS" produced by Kyoritsu Materials Co, Ltd.) having a specific gravity of 4.8, a dielectric constant of 180, and a dielectric dissipation factor of 0.0003 or ceramic powder ("HF-120" produced by Kyoritsu Materials Co., Ltd.) having a specific gravity of 5.9, a dielectric constant of 120, and a dielectric dissipation factor of 0.0002, carbon black ("SEAST S" produced by Tokai Carbon Co., Ltd.), and a processing aid containing process oil ("PW380" produced by Idemitsu Kosan Co., Ltd.) were mixed with one another at the mixing ratio shown in table 1. After the mixture was kneaded by a press kneader, a molded body of each of the examples and the comparative examples having a dimension of 100 mm×80 mm×2.0 mm was obtained by heated compression molding. The vulcanization condition for each specimen was 170° C.×20 minutes.

The dielectric constant, dielectric dissipation factor, tensile elongation, hardness, flexibility, and whether bleeding occurred were measured on the molded body of the highly dielectric elastomer composition obtained in each of the examples and the comparative examples by a method described below. Table 1 shows the result of the measurement.

Comparative Example 1

Except that the highly dielectric elastomer composition did not contain the ceramic powder and the carbon black, processing and measurement were performed by carrying out methods similar to those of the example 1. Table 1 shows the results.

Comparative Examples 2 and 3

Except that the highly dielectric elastomer composition did not contain the ceramic powder, processing and measurement were performed by carrying out methods similar to those of the example 1. Table 1 shows the results.

Comparative Example 4

Except that the highly dielectric elastomer composition did not contain the carbon black, processing and measurement were performed by carrying out methods similar to those of the example 1. Table 1 shows the results.

<Measurement of Dielectric Constant and Dielectric Dissipation Factor>

The dielectric constant and dielectric dissipation factor of each of the obtained molded bodies were measured by a capacitance method at 25° C. and in frequency band of 950 MHz. A measuring apparatus used in the capacitance method was an impedance analyzer: E4991A (produced by AJIRENTOTEKUNOROJI Inc.). An electrode used was 16453A (produced by AJIRENTOTEKUNOROJI Inc.).

<Measurement of Tensile Elongation and Hardness>

The tensile elongation and the hardness were measured in accordance with JIS K 6251 and JIS K 6253 respectively.

<Flexibility Test>

Each of the obtained molded bodies were processed into a strip specimen having a dimension of 100 mm×10 mm×2.0 mm. The central portion of each specimen was bent (metal cylinder: length of 50 mm was utilized) by 180° to form a circular arc having a diameter of 8 mm. As a result of bending, molded bodies which formed a circular shape easily were judged excellent in the flexibility thereof and marked with ○. Molded bodies which deformed but became opaque (changed color) were judged bad in the flexibility thereof and marked with Δ. Molded bodies which were not resistant to deformation and progressed crack were judged inferior in the flexibility thereof and marked with X.

<Test for Examining Whether Bleeding Occurred>

The surface of a molded body having a dimension of 100 mm×80 mm×2.0 mm obtained by heated compression molding was visually inspected to observe whether the process oil bled thereon.

TABLE 1

| | Mixing ratio (part by weight) of each component of highly dielectric elastomer composition | | | | | Highly dielectric elastomer molded body | | | | | |
|---|---|---|---|---|---|---|---|---|---|---|---|
| | Ethylene propylene rubber | Ceramic powder ST-NAS | HF120 | Carbon black ("SEAST S") | Assistant | 950 MHz Dielectric constant | Dielectric dissipation factor | JIS K 6253 Elongation (%) | JIS K 6251 Hardness (JIS-A) | Flexibility | Bleeding |
| Example | | | | | | | | | | | |
| 1 | 100 | 50 | — | 5 | 70 | 4.4 | 0.005 | 320 | 47 | ○ | Did not occur |
| 2 | 100 | 50 | — | 25 | 70 | 4.5 | 0.005 | 315 | 48 | ○ | Did not occur |
| 3 | 100 | 50 | — | 40 | 70 | 5.0 | 0.007 | 300 | 50 | ○ | Did not occur |
| 4 | 100 | 150 | — | 25 | 70 | 6.5 | 0.005 | 325 | 57 | ○ | Did not occur |
| 5 | 100 | 300 | — | 25 | 70 | 10.0 | 0.004 | 330 | 66 | ○ | Did not occur |
| 6 | 100 | — | 150 | 25 | 70 | 4.0 | 0.005 | 300 | 53 | ○ | Did not occur |
| 7 | 100 | — | 300 | 25 | 70 | 7.0 | 0.004 | 320 | 62 | ○ | Did not occur |
| 8 | 100 | — | 450 | 5 | 70 | 8.7 | 0.004 | 310 | 66 | ○ | Did not occur |
| 9 | 100 | — | 450 | 25 | 70 | 9.0 | 0.004 | 290 | 68 | ○ | Did not occur |
| 10 | 100 | — | 450 | 40 | 70 | 9.5 | 0.007 | 270 | 69 | ○ | Did not occur |
| Comparative example | | | | | | | | | | | |
| 1 | 100 | — | — | 0 | 70 | 3.2 | 0.004 | 340 | 42 | ○ | Occurred |
| 2 | 100 | — | — | 25 | 70 | 3.4 | 0.005 | 300 | 47 | ○ | Did not occur |
| 3 | 100 | — | — | 60 | 70 | 3.8 | 0.022 | 220 | 62 | ○ | Did not occur |
| 4 | 100 | 50 | — | 0 | 70 | 4.5 | 0.005 | 310 | 48 | ○ | Occurred |
| 5 | 100 | 50 | — | 60 | 70 | 5.1 | 0.023 | 270 | 54 | ○ | Did not occur |
| 6 | 100 | 450 | — | 25 | 70 | 16.0 | 0.004 | 250 | 76 | Δ | Did not occur |
| 7 | 100 | 600 | — | 25 | 70 | 21.0 | 0.004 | 230 | 88 | Δ | Did not occur |
| 8 | 100 | — | 600 | 25 | 70 | 11.0 | 0.004 | 150 | 80 | Δ | Did not occur |
| 9 | 100 | — | 1200 | 25 | 70 | 19.0 | 0.004 | 92 | 90 | x | Did not occur |

In all of the examples 1 through 10, the molded bodies had an elongation of not less than 250% and a hardness of not more than 70 and were excellent in the flexibility thereof. The process oil did not bleed. Thus the molded bodies are preferable as a material of a dielectric. On the other hand, bleeding occurred on the surfaces of the molded bodies of the comparative examples 1 and 4 which did not contain the carbon black, which is unpreferable. The molded bodies of the comparative examples 3 and 5 which contained as large as 60 parts by weight of the carbon black had the dielectric dissipation factor not less than 0.02, which is unpreferable. The molded bodies of the comparative examples 6 through 9 which contained a large amount of ceramic powder had the dielectric constant not less than 10, had a small amount of elongation, was hard, and unflexible, which is unpreferable

INDUSTRIAL APPLICABILITY

The highly dielectric elastomer molded body of the present invention is inexpensive and excellent in the dielectric property and flexibility thereof and can be used at a UHF band having 800 to 960 MHz. Therefore the highly dielectric elastomer molded body can be preferably utilized as the electronic component material for a high frequency use.

The invention claimed is:

1. A highly dielectric elastomer molded body formed by molding a highly dielectric elastomer composition comprising an elastomer, carbon black and dielectric ceramic powder,
    said molded body having a tensile elongation not less than 250% and a hardness not more than 70,
    wherein in measurement at a frequency of 950 MHz, a dielectric constant of said molded body is 4 to 10, and a dielectric dissipation factor of said molded body is not more than 0.02,
    wherein said elastomer consists of one kind or not less than two kinds of elastomers selected from a group of a styrene elastomer and an olefinic elastomer,
    wherein said carbon black is other than acetylene-based carbon black, and
    wherein the following (A) or (B) is satisfied:
    (A) said highly dielectric elastomer composition contains 5 to 40 by weight of said carbon black and 50 to 300 parts by weight of said dielectric ceramic powder mixed with 100 parts by weight of said elastomer, wherein a dielectric constant of a sintered compact of said dielectric ceramic powder, measured at a frequency of 950 MHz, is 180;
    (B) said highly dielectric elastomer composition contains 5 to 40 parts by weight of said carbon black and 150 to 450 parts by weight of said dielectric ceramic powder mixed with 100 parts by weight of said elastomer, wherein a dielectric constant of a sintered compact of said dielectric ceramic powder, measured at a frequency of 950 MHz, is 120.

2. The highly dielectric elastomer molded body according to claim 1, wherein a specific gravity of said elastomer is 0.8 to 1.1.

3. The highly dielectric elastomer molded body according to claim 1, wherein said elastomer is ethylene propylene rubber.

4. An electronic component material, for a high frequency use, which is used to handle an electric signal of a UHF band having a frequency of 800 to 960 MHz is made of a highly dielectric elastomer molded body according to claim 1.

5. The electronic component material according to claim 4, which is obtained by sticking an electrode to a surface of said highly dielectric elastomer molded body or insert-molding said electrode into said highly dielectric elastomer molded body.

* * * * *